3,281,452
POLYCYANO QUATERNARY AMMONIUM COMPOUNDS

Charles Kapar, Kings County, N.Y., assignor to Coastal Interchemical Company, Brooklyn, N.Y.
No Drawing. Filed Dec. 23, 1963, Ser. No. 332,923
3 Claims. (Cl. 260—465.5)

This invention relates to polycyano quaternary ammonium compounds, and more particularly to tris cyanomethyl alkoxy quaternary ammonium compounds produced by the reaction of nitrilotriacetonitrile with an alkylene oxide.

It is an object of this invention to provide novel quaternary amines possessing reactive functional groups.

It is another object of this invention to provide novel non-crystalline water soluble derivatives of nitrilotriacetonitrile useful as antistatic agents and capable of cross-linking amine-containing polymers.

These and other objects of the invention, together with means and methods for attaining them, will be apparent from the following detailed description.

It has now been discovered that these and other objects are accomplished by providing a quaternary ammonium compound which may be presented by the formula

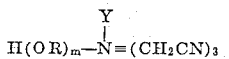

or

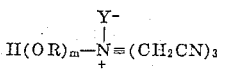

wherein R is selected from the group consisting of ethylene and propylene, $m$ is an integer between 1 and 15, and Y represents a monovalent or polyvalent anion selected from the group consisting of hydroxyl, and anions of acids having a dissociation constant greater than $1 \times 10^{-5}$. The compounds of this invention are especially useful in view of the high reactivity of the nitrile groups, each of which is activated by the alpha-positioned electrophilic nitrogen atom, said reactivity being enhanced by the potential resonance stabilization of transient intermediate reaction structures in view of the symmetry of the molecule.

When $m$ is in the range of 1–3, the compounds of this invention are generally hard glassy materials. With longer polyalkylene oxide chains, e.g. where $m$ is 4–15, the compounds range from viscous oils to paste-like solids. In view of their water soluble, non-crystalline nature and cationic charge, the quaternary compounds of this invention are especially useful in the treatment of negatively charged substrates such as leather, wood, paper, cotton, and the like, to effect improvements in properties such as softness, hygroscopicity, and resistance to fungicidal attack.

The compounds of this invention are found to be especially reactive with primary and second aliphatic amines in the presence of water, whereby the nitrile groups are converted into N-substituted amides in accordance with the following equations:

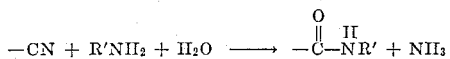

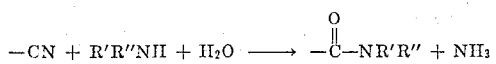

when the amine reactant is polyfunctional, e.g. hexamethylenediamine, a polyamide polymer results. When the amine groups are attached to an existing polymer, the compounds of this invention, employed in amounts between 1% and 5% based on the polymer, effect cross-linking which affords desirable polymer modifications. Suitable amine-containing polymers include: amine-terminated polyhexamethylene adipamide and polycaprolactam, polyethylene glycol wherein the terminal hydroxyl groups are replaced by amine groups as described in Belgian Patents 566,446 and 554,506, polymeric polyamines of U.S. Patent 2,495,255, polymers of beta aminoethyl methacrylate, and amine-substituted polyhydrocarbons and polyesters. In smaller amounts, in the range of 0.1% to 1%, the quaternary compounds of this invention, when applied to synthetic fibers, improve the affinity for acid dyestuffs of fibers so treated. When reacted with long chain fatty amines such as stearyl amine, distearyl amine, oleyl amine, etc., the resultant N-fatty alkyl amides obtained are useful as textile softening and antistatic agents.

The compounds of this invention may also be converted into chelating agents by hydrolysis of the nitrile groups to the carboxylic acid, or by reaction of the nitrile groups with hydroxyl amine to form the amidoxime derivative.

The compounds of this invention may be prepared by reacting nitrilotriacetonitrile with ethylene oxide or with ethylene oxide/propylene oxide mixtures in the presence of a strong acid catalyst in a polar solvent having no active hydrogen atoms as may be determined by the Zerewitinoff method as described by Kohler in J. Am. Chem. Soc., 49, 3181 (1927); exemplary solvents being dioxane, methyl ethylketone, dimethylformamide, and the like. The acid should have a dissociation constant of at least $1 \times 10^{-5}$ and should be employed in amounts of between about 0.5 and 1.2 equivalents per equivalent of the nitrilotriacetonitrile. The reaction may be carried out at temperatures preferably in the range of 20° C. to 120° C. and may generally be completed in 2 to 15 hours. After removal of solvent, the reaction product is easily separated from any unreacted nitrilotriacetonitrile by virtue of the insolubility of the latter in water. The products may be purified by fractional precipitation from solvent/non-solvent mixtures and by ion exchange and chromatographic adsorption column methods. The use of ethylene oxide in the production of the compounds of this invention is preferable in view of its greater reactivity.

The anion Y may be halogen, hydroxyl, nitrate, sulfate, phosphate, acetate, chloroacetate, sulfonate, phosphonate, phthalate, and the like. When multivalent, the charge on the anion is balanced by association with the necessary number of monovalent quaternary ammonium cations. In general the anions will be derived from the catalyst acid, but the anion can be interchanged when desired by treatment of the compound with suitable ion exchange resins, or by neutralization of the hydroxyl anion compound with a suitable acid. The quaternary ammonium hydroxide may be prepared from halide salts by treatment with silver oxide; and can be prepared from any inorganic acid salt by treating a waterfree solution of the salt in n-butanol with a slight excess of the sodium salt of the alcohol used. Upon standing for about 16 hours at about 10° C., the crystalline sodium salt of the inorganic acid is filtered from the solution of the quaternary ammonium alkoxide. Water is then added to the mixture to yield the quaternary ammonium hydroxide. The quaternary ammonium hydroxides however, are not very stable and are preferably stored and utilized in aqueous solution.

In order that those skilled in the art may better understand how the present invention can be carried into effect, the following examples are given by way of illustration and not by way of limitation. All parts and percentages are by weight.

Example I

One hundred and thirty-four parts of nitrilotriacetonitrile are dissolved in seven hundred parts dioxane at 90° C. in a three necked flask equipped with agitator, external heating mantle, thermometer, Dry Ice condenser, dropping funnel for addition of acid, and inlet sparger tube for ethylene oxide. Sixty parts concentrated nitric acid and 40 parts ethylene oxide are added over a seven hour period to the continuously agitated mixture maintained at 95° C. After complete addition of the acid and ethylene oxide, the mixture is refluxed for one hour. The dioxane solvent is then removed by evaporation under vacuum. The residue is extracted with water, and the water extract is neutralized with nitric acid and subjected to vacuum evaporation for removal of water. The residue, tris cyanomethyl beta hydroxyethyl ammonium nitrate, is an amber colored glassy solid, and is obtained in a yield of 78% based on the ethylene oxide. The elemental analysis is as follows:

Theoretical (percent): C, 39.8; H, 4.6; N, 29.0; O, 26.5.
Found (percent): C, 40.1; H, 4.8; N, 28.3; O, 25.9.

When 241 parts of the quaternary compound of this example are refluxed with 174 parts hexamethylene diamine and 200 parts water, ammonia is liberated and a high molecular weight polymer is obtained which may be shaped into useful objects and cured by heating in a dry oven. Once cured, the polymer is infusible, and insoluble in most solvents, including dimethylformamide. When granulated, the polymer exhibits ion exchange properties.

*Example II*

One hundred and thirty-four parts of nitrilotriacetonitrile are dissolved in seven hundred parts dioxane at 90° C. in a three necked flask equipped with agitator, external heating mantle, thermometer, Dry Ice condenser, and dropping funnels for addition of acid and alkylene oxide. Ninety eight parts concentrated sulfuric acid, and 618 parts of a mixture of 43% ethylene oxide and 57% propylene oxide, are added over a ten hour period to the continuously agitated mixture maintained at 95° C. After complete addition of the acid and alkylene oxide mixture, the reaction mixture is refluxed for two hours. The dioxane solvent is then removed by evaporation under vacuum. The residue is dissolved in distilled water to form a 5% solution which is then filtered and added to the top of an ion exchange column containing a quaternary amine anion exchange resin in the OH⁻ form. The effluent from the column is subjected to vacuum evaporation to remove the water, and thoroughly dried in a desiccator over $P_2O_5$. The product is a thick yellow hydroscopic paste. The molecular weight, determined by titration of a weighed sample with HCl, is found to be 735, which compares closely with the theoretically predicted value of 770 for tris cyanomethyl hexaethenoxy hexapropenoxy ammonium hydroxide having the empirical formula

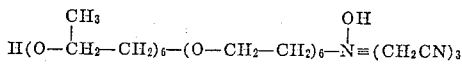

A 5% aqueous solution of the hydroxyl ammonium compound of this example is neutralized with glacial acetic acid and employed as a treating agent for a nylon 66 tricot fabric having propensity for developing static charges. The treating of the fabric is effected by dipping the fabric in the neutralized solution of the ammonium compound, wringing the fabric out to a 100% weight gain of the treating solution, and drying the fabric at 110° C. The fabric thus treated fails to accumulate static electricity, and is thus improved for garment manufacture.

*Example III*

Eighty parts of the tris cyanomethyl beta hydroxy ethyl ammonium nitrate of Example I, dissolved in 300 parts water are added over a period of six hours to a refluxing, continuously stirred mixture of 280 parts monostearyl amine, 100 parts water, and 100 parts dimethylformamide. The mixture is refluxed an additional hour following complete addition of the solution of the quaternary salt. Ammonia gas is liberated throughout the course of the reaction. The mixture is then subjected to vacuum evaporation to remove dimethylformamide and water. The residue is triturated with three 100 cc. portions of benzene to remove unreacted stearyl amine and the residual product is dried of benzene. The product, tris N-stearyl acetamido beta hydroxyethyl ammonium nitrate, having the probable formula

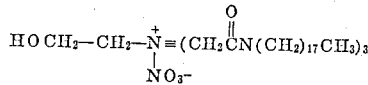

is a waxy solid which forms colloidal solutions in water.

A 0.2% aqueous solution of the quaternary salt of this example is employed as the rinsing medium in the course of an ordinary laundering cycle of cotton turkish towels. The towels thus treated, after tumble drying, have a softer texture and bulkier appearance than control towels washed in identical fashion but without treatment with the quaternary salt.

*Example IV*

A high pressure autoclave provided with means for heating and agitation is charged with 13.4 parts (0.1 mole) nitrilotriacetonitrile, 55.0 parts (1.25 moles) ethylene oxide, 17.2 parts (0.1 mole) para toluene sulfonic acid, and 20 parts dimethylformamide. The mixture is agitated at 70° C. for 15 hours. The reaction product mixture is diluted with 70 parts water, treated with 25 parts activated charcoal, filtered, and subjected to evaporation at 2 mm. Hg and 50° C. to remove all volatile material. The residue is extracted with two 30 part portions of acetone, and re-dried. There is thus obtained 74.2 parts of an amber paste, tris cyanomethyl dodecylethenoxy ammonium para toluene sulfonate. The product is dispersible in water, forming colloidal type solutions found useful in imparting antistatic properties to nylon fabric.

As many variations within the spirit and scope of this invention will occur to those skilled in the art, it is to be understood that the invention is not limited to the specific embodiments thereof except as set forth in the appended claims.

I claim:
1. A tris cyanomethyl quaternary ammonium compound represented by the formula

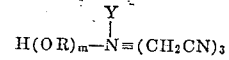

wherein R is selected from the group consisting of ethylene and propylene, $m$ is an integer between 1 and 15, and Y is an anion selected from the group consisting of halogen, hydroxyl, nitrate, sulfate, phosphate, acetate, chloroacetate, sulfonate, phosphonate and phthalate.

2. The compound of claim 1 wherein R is ethylene.
3. The compound of claim 1 wherein Y is nitrate.

No references cited.

CHARLES B. PARKER, *Primary Examiner.*
JOSEPH P. BRUST, *Assistant Examiner.*